US011862908B2

(12) United States Patent
Chang

(10) Patent No.: US 11,862,908 B2
(45) Date of Patent: Jan. 2, 2024

(54) POWER PLUG DEVICE

(71) Applicant: PHIHONG TECHNOLOGY CO., LTD., Taoyuan (TW)

(72) Inventor: Chun-Feng Chang, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 95 days.

(21) Appl. No.: 17/584,177

(22) Filed: Jan. 25, 2022

(65) Prior Publication Data

US 2023/0208084 A1 Jun. 29, 2023

(30) Foreign Application Priority Data

Dec. 29, 2021 (TW) ................................ 110149438

(51) Int. Cl.

*H01R 24/28* (2011.01)
*H01R 13/66* (2006.01)
*H01R 13/504* (2006.01)
*H01R 24/68* (2011.01)
*H01R 103/00* (2006.01)

(52) U.S. Cl.

CPC .......... *H01R 24/28* (2013.01); *H01R 13/504* (2013.01); *H01R 13/665* (2013.01); *H01R 24/68* (2013.01); *H01R 2103/00* (2013.01)

(58) Field of Classification Search

CPC H01R 13/6658; H01R 13/665; H01R 13/504; H01R 24/28; H01R 24/68; H01R 2103/00
USPC ............................... 439/76.1, 692, 694, 695
See application file for complete search history.

(56) References Cited

U.S. PATENT DOCUMENTS 5,115,367 A * 5/1992 Gaus ...................... H02H 5/083 307/118
2004/0102060 A1* 5/2004 Schauz .................. H01R 35/04 439/13
2009/0284221 A1* 11/2009 Liao ...................... H01R 27/00 439/174
2011/0058345 A1* 3/2011 Kuroda ................ H01R 31/065 361/752
2018/0158636 A1* 6/2018 Long ...................... H01H 50/20
2018/0166833 A1* 6/2018 Nie ...................... H02H 1/0007
2020/0244021 A1* 7/2020 Liao ..................... H01R 31/065

* cited by examiner

*Primary Examiner* — Gary F Paumen
(74) *Attorney, Agent, or Firm* — Muncy, Geissler, Olds & Lowe, P.C.

(57) ABSTRACT

A power plug device includes a first housing, a circuit board, a wire assembly and a second housing. The first housing includes an upper-housing body, a through hole and an inner cover. An accommodating portion is arranged in the upper-housing body, the through hole is formed on one side of the upper-housing body, the inner cover is installed in the accommodating portion, a receptive space is arranged in the inner cover, and the through hole interconnects with the receptive space. The wire assembly includes core wires, which passes through the through hole and the receptive space, so that the core wires are accommodated in the accommodating portion, and the receptive space is suitable for accommodating glue to secure the core wires and provides waterproof effect. In addition, dual-layered waterproof structure is used to make the first and second housing joining together having stronger waterproof effect.

18 Claims, 8 Drawing Sheets

POWER PLUG DEVICE

CROSS-REFERRANCE STATEMENT

The present application is based on, and claims priority from, Taiwan Application Serial Number 110149438, filed Dec. 29, 2021, the disclosure of which is hereby incorporated by reference herein in its entirety.

TECHNICAL FIELD

The present invention relates to a technical field related in the electric power application, in particular, to a power plug device.

RELATED ART

Generally, the electric power connection device architecture usually includes a power module, which contains a printed circuit board (PCB) inside, but lacks a waterproof or dustproof structure, therefore moisture or suspended particles can easily penetrate or accumulate on the electrodes of the connection port. As the electric power connection device is gradually worn out, its electrodes will be corroded, causing malfunctions or short circuits, and the voltage of the entire device can rise instantaneously, these can damage the electrical equipment that supplies electrical energy by the electric power connection, shorten its life, and even cause fire or current leakage.

Therefore, how to improve the existing power plug device to improve the above-mentioned drawbacks encountered will be an important issue to be solved.

SUMMARY

In one aspect of the present invention, we propose a power plug device having a waterproof function includes an upper-housing body with an opening and a sealed bottom formed on the opposite side of the opening, wherein an accommodating portion located inside the first housing is formed by the upper-housing body and the sealed bottom, a through hole formed on the upper-housing body, and an annular groove formed on the opening of the upper-housing body consisting of a first upper-housing convex portion, a second upper-housing convex portion, and a an upper-housing concave portion, wherein the upper-housing concave portion is formed between the first upper-housing convex portion and the second upper-housing convex portion, a circuit board installed inside the upper-housing body, a conducting wire assembly passing through the through hole electrically coupled to the circuit board, and a lower-housing body, a pair of conducting pins installed in the lower-housing body and extended outward from one side of the lower-housing body, which is electrically coupled to the circuit board and the conducting wire assembly, a cover edge portion formed on opposite side of the lower-housing body, a first lower-housing convex portion and a second lower-housing convex portion extruding from the cover edge portion to form a lower-housing groove between them, wherein the first lower-housing convex portion docks the upper-housing concave portion, the second upper-housing convex portion docks the lower-housing groove to join the first housing and the second housing and to form waterproof structure.

In one preferred embodiment, a double-layered waterproof structure is formed by docking the first lower-housing convex portion and the upper-housing concave portion together with docking the second upper-housing convex portion and the lower-housing groove to join the first housing and the second housing.

In one preferred embodiment, the upper-housing body further includes an inner cover installed inside the accommodating portion, a receptive space is formed by the inner cover, inner wall of the upper-housing body and the sealed bottom.

In one preferred embodiment, the conducting wire assembly includes core wires, the core wires pass through the through hole and the receptive space to accommodate the core wires in the receptive space.

In one preferred embodiment, the circuit board is installed inside the accommodating portion via a guiding slot located inside the upper-housing body and the core wires is electrically connected to the circuit board.

In one preferred embodiment, the receptive space is filled with glue to secure the core wires.

In one preferred embodiment, the upper-housing body includes a concave portion encircled the through hole.

In one preferred embodiment, the conducting wire assembly includes a conducting wire body and a coupling unit, the coupling unit includes a wire stopper and a necked section.

In one preferred embodiment, the necked section of the conducting wire assembly is buckled with the concave portion of the through hole to form an interlock structure.

In one preferred embodiment, the conducting wire body passes through the coupling unit located in the middle, and the core wires are exposed at one end opposite to the conducting wire body.

In another aspect of the present invention, we propose a power plug device includes an upper-housing body with an opening and a sealed bottom formed on the opposite side of the opening, wherein an accommodating portion located inside the first housing is formed by the upper-housing body and the sealed bottom, a through hole formed on one side of the upper-housing body, and a receptive space formed by an inner cover installed inside the accommodating portion, inner wall of the upper-housing body and the sealed bottom, wherein the through hole interconnects the receptive space, a conducting wire assembly having core wires, the core wires passing through the through hole and the receptive space, a circuit board installed inside the upper-housing body, electrically coupled to the core wires, and a lower-housing body, a pair of conducting pins installed in the lower-housing body and extended outward from one side of the lower-housing body, which is electrically coupled to the circuit board and the conducting wire assembly, wherein the lower-housing body joins the upper-housing body to form a waterproof structure.

In one preferred embodiment, the upper-housing body further includes an annular groove formed on the opening of the upper-housing body consisting of a first upper-housing convex portion, a second upper-housing convex portion, and a an upper-housing concave portion, wherein the upper-housing concave portion is formed between the first upper-housing convex portion and the second upper-housing convex portion.

In one preferred embodiment, the lower-housing body further includes a cover edge portion formed on opposite side of the lower-housing body, a first lower-housing convex portion and a second lower-housing convex portion extruding from the cover edge portion to form a lower-housing groove between them, wherein the first lower-housing convex portion docks the upper-housing concave portion, the second upper-housing convex portion docks the lower-housing groove to join the first housing and the second housing and to form a waterproof structure.

In one preferred embodiment, the receptive space is filled with glue to secure the core wires.

In one preferred embodiment, the receptive space is filled with glue to secure the core wires.

In one preferred embodiment, wherein the conducting wire assembly includes a conducting wire body and a coupling unit.

In one preferred embodiment, the coupling unit includes a wire stopper and a necked section.

In one preferred embodiment, the necked section of the conducting wire assembly is buckled with the through hole to form an interlock structure.

In one preferred embodiment, the conducting wire body passes through the coupling unit located in the middle, and the core wires are exposed at one end opposite to the conducting wire body.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
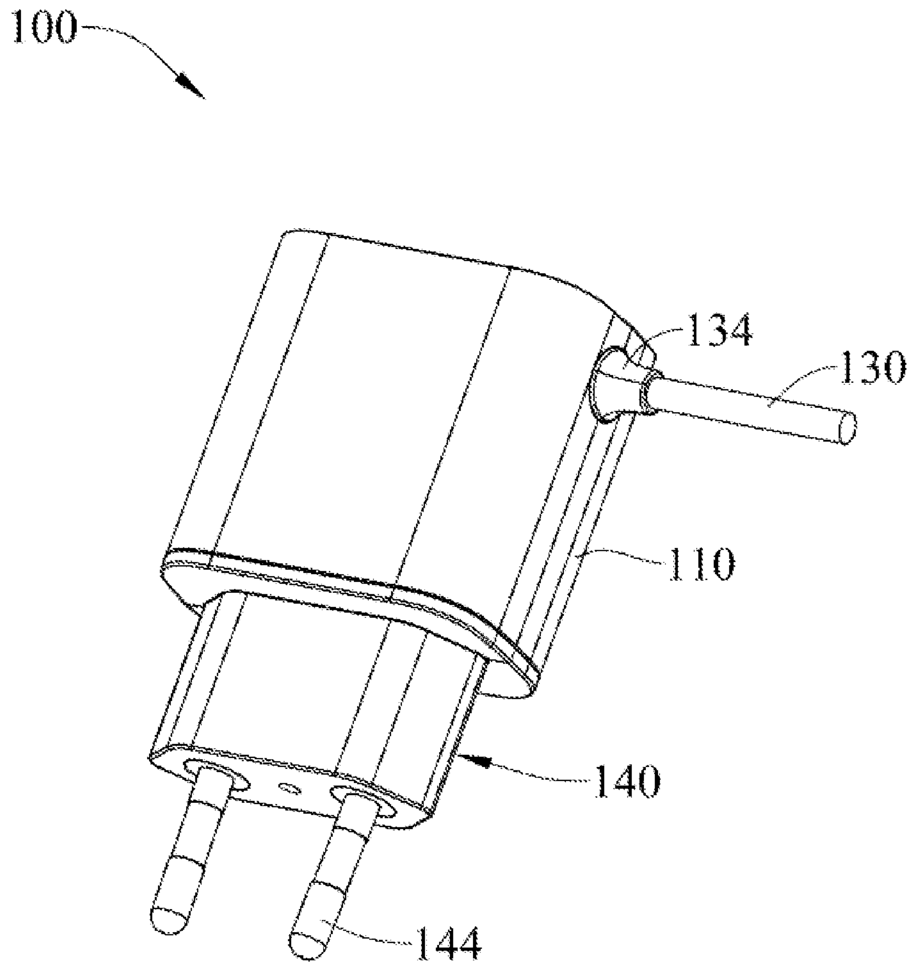
FIG. 1 illustrates a 3-dimentional drawing of a power plug device according to a preferred embodiment of the invention.
Figure 2:
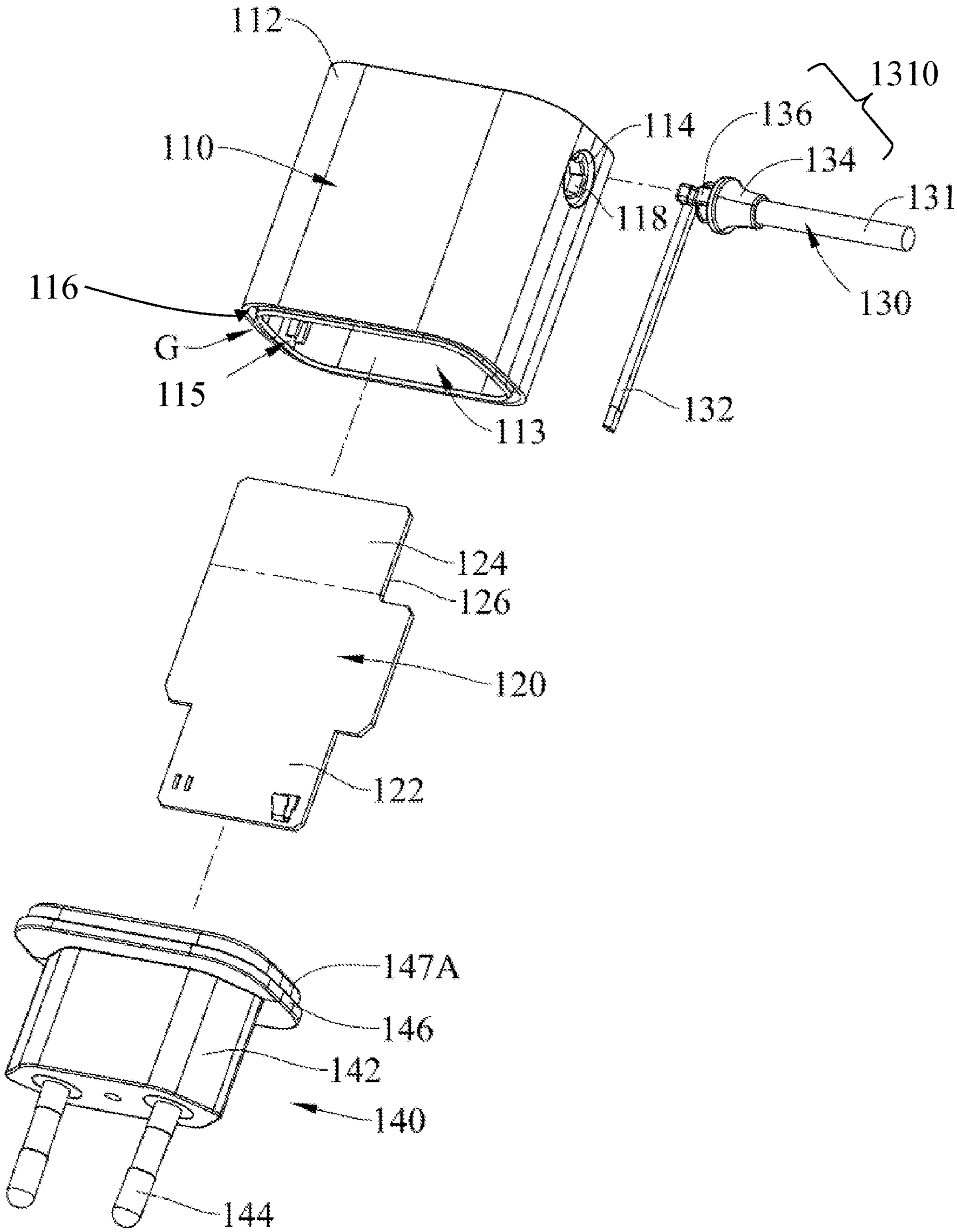
FIG. 2 illustrates exploded view of the power plug device according to a preferred embodiment of the present invention.
Figure 5:
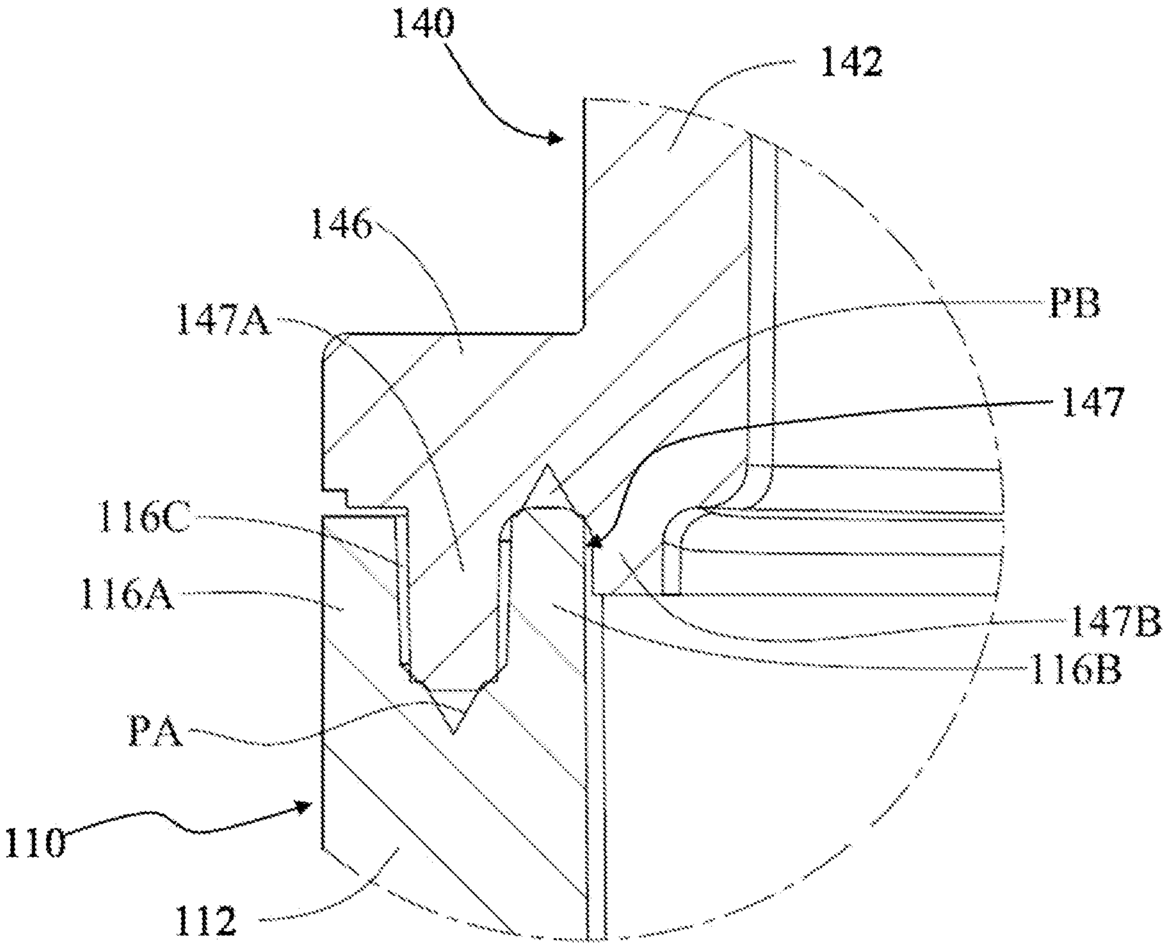
FIG. 5 is a partial enlarged view of circle B of the power plug device illustrated in FIG. 3.

Referring to FIGS. 1-5, which show structural detail of a power plug device 100. The power plug device 100 includes a first housing 110, a circuit board 120, a conducting wire assembly 130, and a second housing 140. The first housing 110 may be referred to an upper housing, and the second housing 140 may be referred to a lower housing. The first housing (upper housing) 110 includes an upper-housing body 112 with an opening G, a bottom closed the upper-housing body 112 on the side opposite to the opening G. The upper-housing body 112 and the bottom form a accommodating portion 113 located in the upper-housing body 112. A through hole 114 is formed on one side of the upper-housing body 112, penetrates the upper shell body 112, interconnecting the accommodating portion 113 and the outside of the upper-housing body 112. An annular groove 116, i.e. an upper-housing groove, is formed on the opening G of the upper-housing body 112. An inner cover 117 is fixed inside the accommodating portion 113 of the first housing 110. Please refers to FIGS. 3-4, which respectively depict the cross-sectional view (FIG. 3) and a partial enlarged view of circle A of the power plug device 100 illustrated in FIG. 3, the inner cover 117 is fixed inside the accommodating portion 113 of the first housing 110, where the space enclosed by the inner cover 117, the inner side wall of the upper-housing body 112, and the bottom thereof form a receptive space 117A. The through hole 114 passes through the receptive space 117A, so that the receptive space 117A can interconnects with the outside of the upper-housing body 112 via the through hole 114. As illustrated in FIG. 2, a guiding slot 115 is formed on inner wall of the upper-housing body 112, which is located inside the accommodating portion 113 of the first housing 110, and extends inward along the inner side wall retracted by a predetermined distance from the opening G. As shown in FIGS. 2 and 5, the annular groove 116 is formed on the opening G of the upper-housing body 112, which is consisted of a ring-shaped first upper-housing convex portion 116A, a ring-shaped second upper-housing convex portion 116B, and a ring-shaped upper-housing concave portion 116C, where the upper-housing concave portion 116C is formed between the first upper-housing convex portion 116A and the second upper-housing convex portion 116B. The circuit board 120 shown in FIG. 2 can be installed in the upper-housing body 112 through the guiding slot 115.

Figure 3:
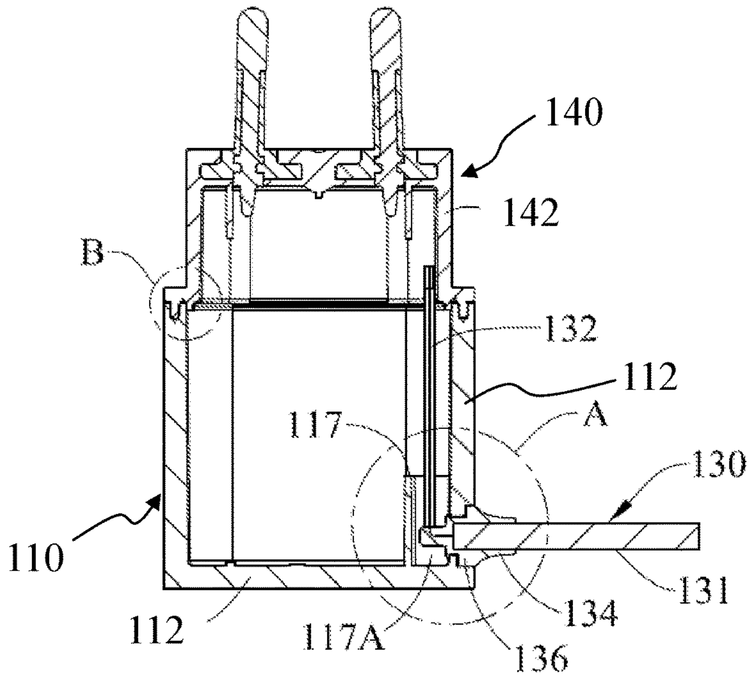
FIG. 3 illustrates the cross-sectional view of the power plug device according to FIG. 1.
Figure 4:
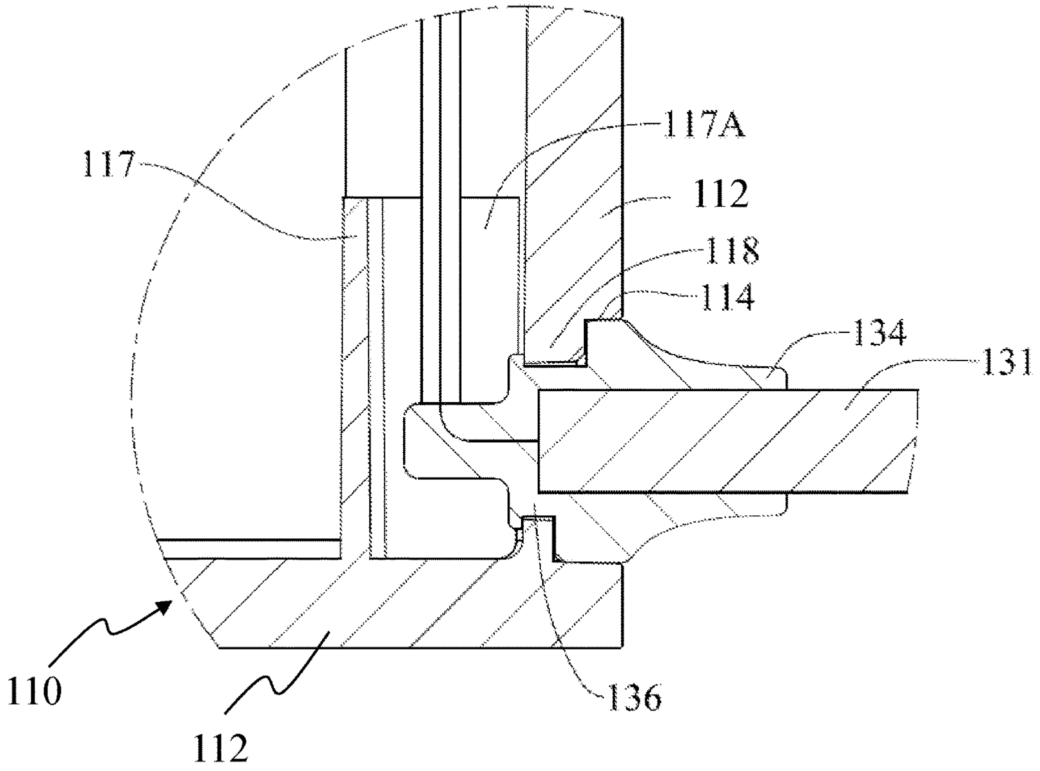
FIG. 4 is a partial enlarged view of circle A of the power plug device illustrated in FIG. 3.

Please refers to FIG. 2 and FIG. 3, a conducting wire assembly 130 passes through the through hole 114 and is electrically connected to the circuit board 120. The circuit board 120 includes a first section 122, a second section 124, and a recess 126. The first section 122 is connected to the second section 124, and the second section 124 having a recess 126. The circuit board 120 is installed in the accommodating portion 113, the recess 126 is supported by the inner cover 117, and the core wires 132 of the conducting wire assembly 130 are electrically connected to the second section 124.

In one embodiment, the first housing 110 includes a concave portion 118, which is formed and encircled on the edge of the through hole 114 connected to the upper-housing body 112. The conducting wire assembly 130 includes a conducting wire body 131 and a coupling unit 1310. The coupling unit 1310 includes a wire stopper 134 and a necked section 136. The conducting wire body 131 covers the core wires 132 and is connected to the necked section 136. The conducting wire body 131 passes through the coupling unit 1310, i.e. the wire stopper 134 and the necked section 136 in the middle, have the core wires 132 exposed at one end. The necked section 136 of the coupling unit 1310 is used to buckle the concave portion 118 of the through hole 114, while installing the conducting wire assembly 130, for forming an interlocking structure between the conducting wire assembly 130 and the upper-housing body 112. Since the conducting wire body 131 and the covered core wires 132 used in the present invention are made of soft materials, the necked section 136 can be designed as a snap structure, and the conducting wire assembly 130 can be easily assembled into the first housing 110 without applying excessive force.

In one embodiment of the present invention, there are at least two mating convex and concave structure between the first housing 110 and the second housing 140 for combining them together, and the details will be disclosed in the following paragraphs.

Please refers to FIGS. 2-5, a second housing 140 includes a lower-housing body 142, a pair of conducting pins, a cover edge portion 146, a ring-shaped first lower-housing convex portion 147A and second lower-housing convex portion 147B extruding from there to form a lower-housing groove 147 between them. The lower-housing groove 147 is also ring-shaped (annular). A pair of conductive pins 144 are arranged on one side of the lower-housing body 142 and protrude to its outside for conducting electricity. The cover edge portion 146 is connected to the other side (opposite side) of the lower-housing body 142. FIG. 5 shows the connection details of the upper and lower housings, in which the first lower-housing convex portion 147A and the second lower-housing convex portion 147B protrude from the cover edge portion 146, and a ring-shaped lower-housing groove 147 are formed between the first lower-housing convex portion 147A and the second lower-housing convex portion 147B. The first lower-housing convex portion 147A of the lower housing body 140 is ultrasonically welded into the upper-housing concave portion 116C of the upper housing body 110, and the second upper-housing convex portion 116B of the upper housing body 110 is ultrasonically welded into the lower-housing groove 147 of the second housing 140, so that the first housing (upper housing) 110 and the second housing (lower housing) 140 are combined together to form a sealed structure.

Figure 6:
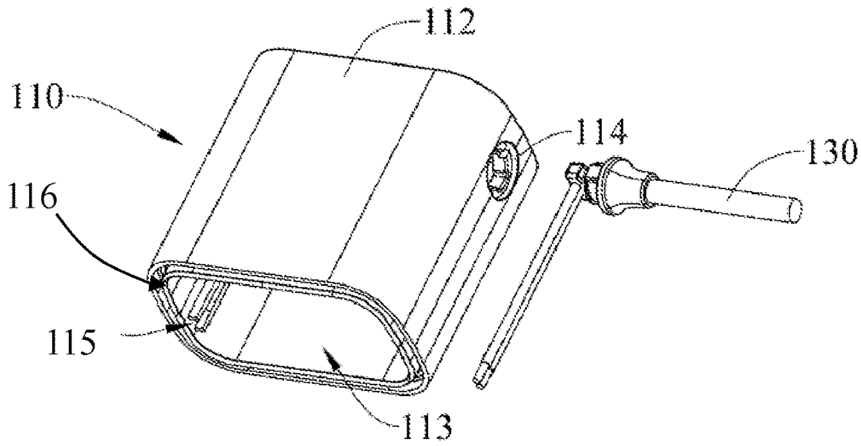
FIGS. 6-12 illustrate a schematic diagram of the assembly process of the power plug device according to a preferred embodiment of the present invention.
Figure 7:
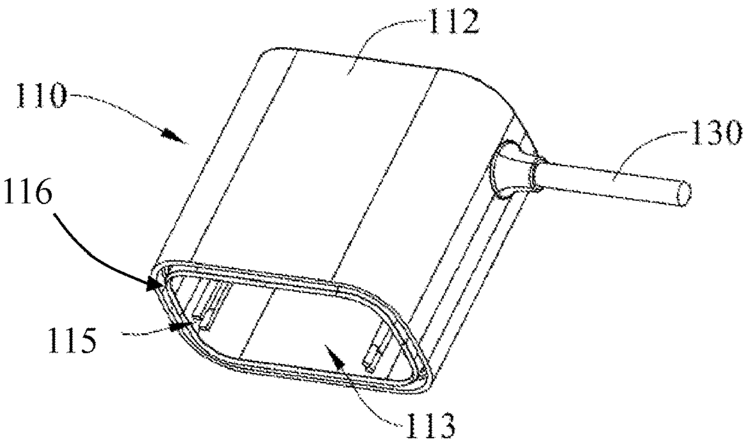
Figure 8:
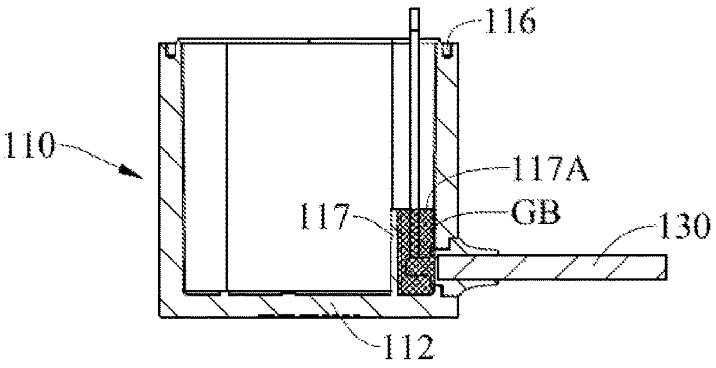
Figure 13:
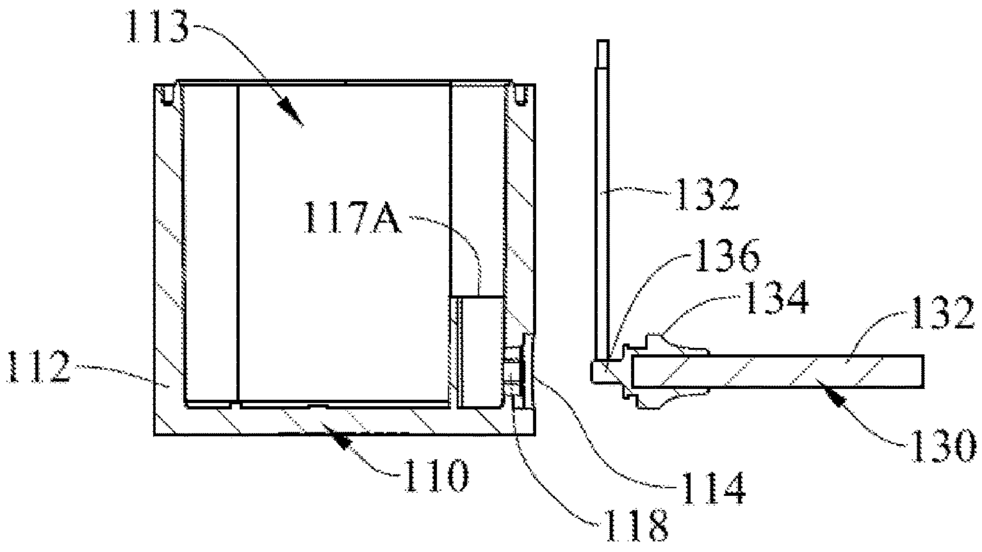
FIGS. 13-14 illustrate a schematic diagram of the assembly process of a wire assembly according to a preferred embodiment of the present invention.
Figure 14:
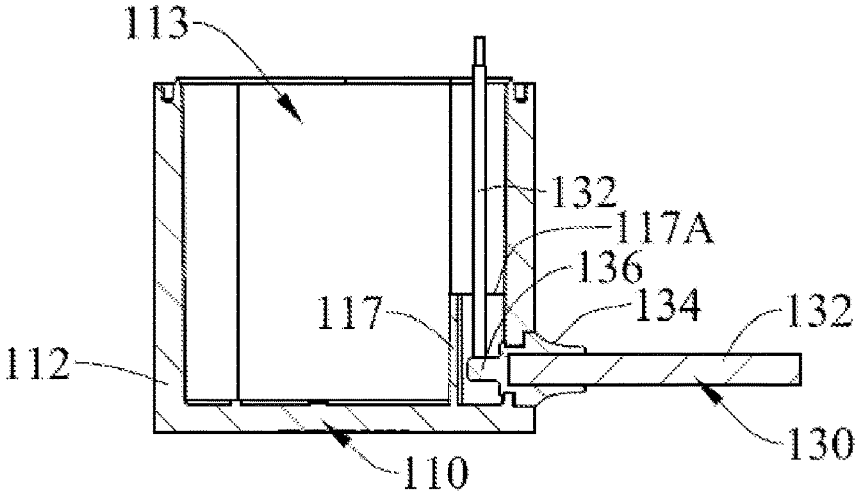

In the assembly process, first, as shown in FIGS. 6-8, wire assembly is performed, that is, passing the conducting wire assembly 130 through the through hole 114. In detail, as shown in FIGS. 13 to 14, the conducting wire assembly 130 includes core wires 132, which passes through the through hole 114 and the receptive space 117A, so that the core wire 132 is accommodated in the accommodating portion 113 of the upper housing 110. Then, the glue filling operation is performed, and the glue GB is suitable for filling the glue GB in the receptive space 117A to secure the core wires 132 (as shown in FIG. 8), which provides a waterproof filling for the exposed core wires 132. The amount of the glue GB does not have to cover the entire accommodating portion 113, but only needs to be able to fill the receptive space 117A, which can greatly reduce the amount of using glue GB. It should be noted that this disclosure does not limit the composition of glue GB applied, for example, which can be chosen from silicone, epoxy resin, polyurethane resin, butyl rubber, chlorosulfonated polyethylene rubber, natural rubber, acrylic rubber, neoprene glue, or combinations of the above materials.

Moreover, since the conducting wire body 131 of the present invention is a soft material, the necked section 136 can be designed as a buckle structure, and the conducting wire assembly 130 can be easily assembled into the first housing 110 without applying excessive force.

Figure 9:
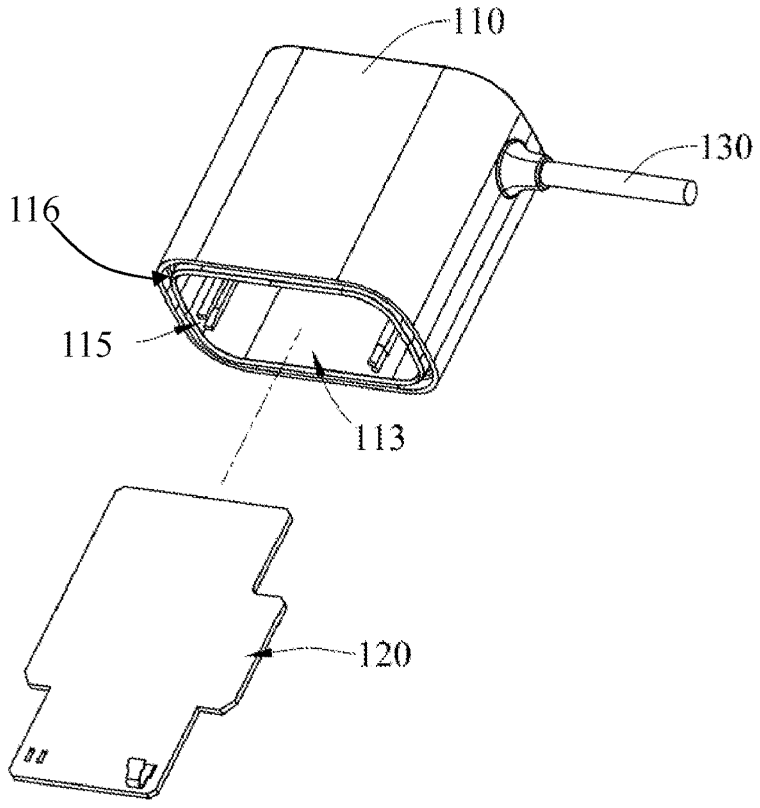
Figure 10:
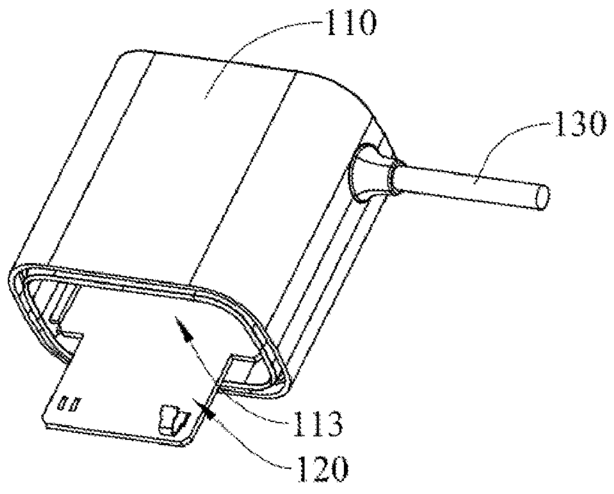

Next, as shown in FIGS. 9-10, the circuit board 120 is assembled into the accommodating portion 113 of the first housing 110, and the conducting wire assembly 130 is electrically connected to the circuit board 120. In detail, the circuit board 120 is installed inside the accommodating portion 113 through the guiding slot 115, the recess 126 is supported by the inner cover 117 located in the accommodating portion 113, and the core wires 132 is electrically connected to the second section 124 of the circuit board 120 (see FIG. 2).

Figure 11:
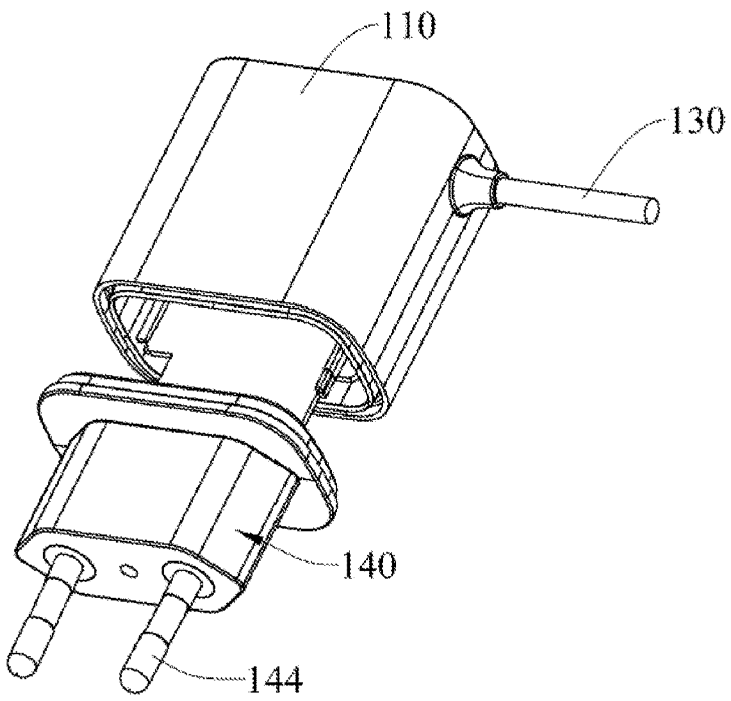
Figure 12:
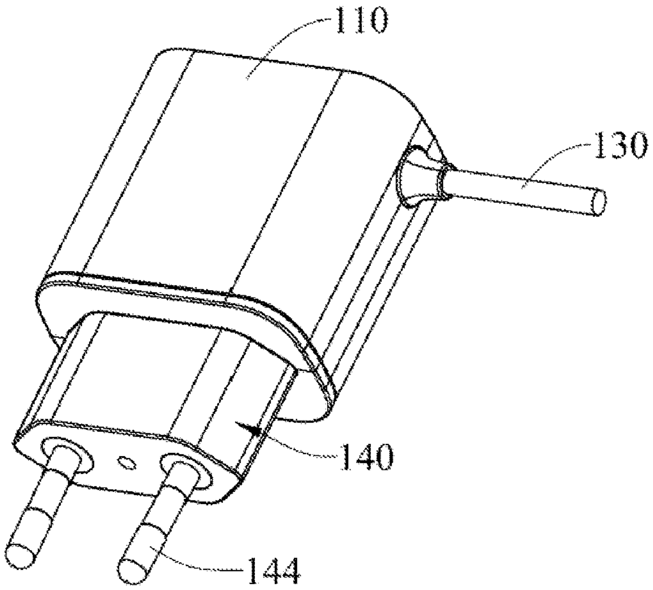

As shown in FIGS. 11-12, the second housing 140 is then assembled with the first housing 110 to complete the assembly. In detail, as shown in FIG. 5, the first lower-housing convex portion 147A and the second lower-housing convex portion 147B protrude from the cover edge portion 146 of the second housing 140, the first lower-housing convex portion 147A has a welded portion PA, and the second lower-housing convex portion 116B has a welded portion PB, where the first lower-housing convex portion 147A, the welded portion PA, the second lower-housing convex portion 116B, and the welded portion PB are all ring-shaped. The first lower-housing convex part 147A is ultrasonically welded into the upper-housing concave portion 116C through the welding portion PA, while the second upper-housing convex portion 116B is ultrasonically welded into the lower-housing groove 147 through the welding portion PB, and therefore the first housing 110 is combined with the second housing 140. In addition to the ultrasonic welding of the upper-housing concave portion 116C, the ultrasonic welding is also used in the lower-housing groove 147 to achieve a double-layer waterproof structure and therefore improve the waterproof effect of the power plug device 100.

In summary, the present disclosure allows the first housing 110 and the second housing 140 to be joined together through dual-layer ultrasonic welding, and achieves a better waterproof effect for the power plug device 100.

In addition, a pair of conductive pins 144 provided on the lower-housing body 142 is electrically connected to the circuit board 120 to form a conductive path with the conducting wire assembly 130.

Furthermore, the accommodating groove of the present disclosure is suitable for accommodating glue GB to secure the exposed core wires 132. In this way, the amount of glue GB used does not have to cover the entire accommodating portion 113 of the first housing (lower housing) 110, it only needs to fill up the receptive space 117A, which can greatly reduce the amount of glue to be used.

In addition, the receptive space 117A of the present disclosure is suitable for accommodating glue GB to secure the exposed core wires 132, and the glue GB also provide waterproof effect for the exposed core wires 132.

Since the conducting wire assembly 130 of the present disclosure is made of a soft material, its necked section 136 can be designed as a buckle structure, and the conducting wire assembly 130 can be assembled with the first housing (lower housing) 110 without applying excessive force.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. A power plug device comprising:

an upper-housing body with an opening and a sealed bottom formed on said opposite side of said opening, wherein an accommodating portion is formed by said upper-housing body and said sealed bottom;

a through hole formed on said upper-housing body;

an annular groove formed on said opening of said upper-housing body consisting of a first upper-housing convex portion, a second upper-housing convex portion, and a an upper-housing concave portion, wherein said upper-housing concave portion is formed between said first upper-housing convex portion and said second upper-housing convex portion;

a circuit board installed inside said upper-housing body;

a conducting wire assembly passing through said through hole electrically coupled to said circuit board; and a lower-housing body;

a pair of conducting pins installed in said lower-housing body and extended outward from one side of said lower-housing body, which is electrically coupled to said circuit board and said conducting wire assembly;

a cover edge portion formed on opposite side of said lower-housing body;

a first lower-housing convex portion and a second lower-housing convex portion extruding from said cover edge portion to form a lower-housing groove between them, wherein said first lower-housing convex portion docks said upper-housing concave portion, said second upper-housing convex portion docks said lower-housing groove to form a waterproof structure.

2. The power plug device of claim 1, wherein a double-layered waterproof structure is formed by docking said first lower-housing convex portion and said upper-housing concave portion together with docking said second upper-housing convex portion and said lower-housing groove to join said first housing and said second housing.

3. The power plug device of claim 1, wherein said upper-housing body further includes an inner cover installed inside said accommodating portion, a receptive space is formed by said inner cover, inner wall of said upper-housing body and said sealed bottom.

4. The power plug device of claim 3, wherein said conducting wire assembly includes core wires, said core wires pass through said through hole and said receptive space to accommodate said core wires in said receptive space.

5. The power plug device of claim 4, wherein said receptive space is filled with glue to secure said core wires.

6. The power plug device of claim 4, wherein said circuit board is installed inside said accommodating portion via a guiding slot located inside said upper-housing body and said core wires is electrically connected to said circuit board.

7. The power plug device of claim 1, wherein said upper-housing body includes a concave portion encircled said through hole.

8. The power plug device of claim 7, wherein said conducting wire assembly includes a conducting wire body and a coupling unit, said coupling unit includes a wire stopper and a necked section.

9. The power plug device of claim 8, wherein said necked section of said conducting wire assembly is buckled with said concave portion of said through hole to form an interlock structure.

10. The power plug device of claim 8, wherein said conducting wire body passes through said coupling unit located in the middle, and said core wires are exposed at one end opposite to said conducting wire body.

11. A power plug device comprising:

an upper-housing body with an opening and a sealed bottom formed on the opposite side of said opening, wherein an accommodating portion is formed by said upper-housing body and said sealed bottom;

a through hole formed on one side of said upper-housing body; and a receptive space formed by an inner cover installed inside said accommodating portion, inner wall of said upper-housing body and said sealed bottom, wherein said through hole interconnects said receptive space;

a conducting wire assembly having core wires, said core wires passing through said through hole and said receptive space;

a circuit board installed inside said upper-housing body, electrically coupled to said core wires;

a lower-housing body;

a pair of conducting pins installed in said lower-housing body and extended outward from one side of said lower-housing body, which is electrically coupled to said circuit board and said conducting wire assembly;

wherein said lower-housing body joins said upper-housing body to form a waterproof structure.

12. The power plug device of claim 11, wherein said upper-housing body further includes an annular groove formed on said opening of said upper-housing body consisting of a first upper-housing convex portion, a second upper-housing convex portion, and a an upper-housing concave portion, wherein said upper-housing concave portion is formed between said first upper-housing convex portion and said second upper-housing convex portion.

13. The power plug device of claim 12, wherein said lower-housing body further includes:

a cover edge portion formed on opposite side of said lower-housing body;

a first lower-housing convex portion and a second lower-housing convex portion extruding from said cover edge portion to form a lower-housing groove between them, wherein said first lower-housing convex portion docks said upper-housing concave portion, said second upper-housing convex portion docks said lower-housing groove to join said first housing and said second housing and to form a waterproof structure.

14. The power plug device of claim 11, wherein said receptive space is filled with glue to secure said core wires.

15. The power plug device of claim 11, wherein said conducting wire assembly includes a conducting wire body and a coupling unit.

16. The power plug device of claim 15, wherein said coupling unit includes a wire stopper and a necked section.

17. The power plug device of claim 16, wherein said necked section of said conducting wire assembly is buckled with said through hole to form an interlock structure.

18. The power plug device of claim 16, wherein said conducting wire body passes through said coupling unit located in the middle, and said core wires are exposed at one end opposite to said conducting wire body.

* * * * *